United States Patent
Koskela et al.

(10) Patent No.: US 9,474,088 B2
(45) Date of Patent: Oct. 18, 2016

(54) ALLOCATION OF RESOURCES IN AN ACCESS POINT

(71) Applicant: Broadcom Corporation, Irvine, CA (US)

(72) Inventors: Timo Kalevi Koskela, Oulu (FI); Anna Pantelidou, Oulu (FI); Juho Mikko Oskari Pirskanen, Kangasala (FI)

(73) Assignee: Broadcom Corporation, Irvine, CA (US)

( * ) Notice: Subject to any disclaimer, the term of this patent is extended or adjusted under 35 U.S.C. 154(b) by 330 days.

(21) Appl. No.: 14/196,059

(22) Filed: Mar. 4, 2014

(65) Prior Publication Data
US 2014/0254361 A1    Sep. 11, 2014

(30) Foreign Application Priority Data
Mar. 5, 2013  (GB) .................................. 1303904.5

(51) Int. Cl.
| | |
|---|---|
| *H04W 74/00* | (2009.01) |
| *H04W 36/22* | (2009.01) |
| *H04W 72/04* | (2009.01) |
| *H04W 4/00* | (2009.01) |
| *H04W 52/02* | (2009.01) |
| *H04W 72/12* | (2009.01) |

(52) U.S. Cl.
CPC ......... *H04W 74/006* (2013.01); *H04W 36/22* (2013.01); *H04W 52/0216* (2013.01); *H04W 72/0446* (2013.01); *H04W 72/121* (2013.01); *H04W 4/005* (2013.01)

(58) Field of Classification Search
CPC ............... H04W 4/005; H04W 52/02; H04W 52/0209–52/0222; H04W 72/042; H04W 72/0446; H04W 72/048; H04W 72/0493; H04W 72/121; H04W 72/1257; H04W 72/1289; H04W 74/08–74/0891
See application file for complete search history.

(56) References Cited

U.S. PATENT DOCUMENTS

| | | | | |
|---|---|---|---|---|
| 2013/0128798 | A1* | 5/2013 | Liu | H04W 48/12 370/312 |
| 2015/0359008 | A1* | 12/2015 | Wang | H04W 74/004 370/330 |

FOREIGN PATENT DOCUMENTS

| | | |
|---|---|---|
| WO | 2013078303 | 7/2013 |
| WO | 2013116534 | 8/2013 |

* cited by examiner

*Primary Examiner* — Michael Thier
*Assistant Examiner* — Eric Myers
(74) *Attorney, Agent, or Firm* — Oblon, McClelland, Maier & Neustadt, L.L.P (57) ABSTRACT

A method, apparatus and computer program facilitate the assignment of stations to slots of a restricted access window (RAW) to support communications between the stations and an access point. In a method for use in an access point, a broadcast message is caused to be provided to the station(s). The broadcast message includes an indication of a type of stations to access the RAW and one or more of a duration of the slot(s) in the RAW allocated to a first type of station, a duration of the RAW allocated to the first type of station, a duration of the slot(s) in the RAW allocated to a second type of station or a duration of the RAW allocated to the second type of station. The method also provides for access for one or more stations of the type that was indicated within the slots of the RAW.

19 Claims, 6 Drawing Sheets

ALLOCATION OF RESOURCES IN AN ACCESS POINT

TECHNICAL FIELD

An embodiment of the present invention relates generally to wireless communications technology and, more particularly, to a method, apparatus and computer program for facilitating communication between an access point and a plurality of stations.

BACKGROUND

Access points (APs) are capable of communicating with a large number of associated stations (STAs). The STAs may be, for example, battery powered sensors which transmit and receive data on rare instances and which remain in a low power operation mode for relatively long periods of time. The Institute of Electrical and Electronics Engineers (IEEE) 802.11ah standard defines the communication between stations and access points in the sub 1 gigahertz (GHz) band. The 802.11ah standard describes several different use cases including the use of stations to serve as sensors and meters, to provide backhaul sensor and meter data and to provide extended range wi-fi.

With regard to the use of stations as sensors and meters, the access point may be capable of supporting a large number of associated stations, such as over 6,000 stations, which may operate on a very strict energy budget. The stations may be either near to or far away from the access point, such as by being located anywhere within a one kilometer radius from the access point. The stations may be battery powered sensors which are configured to transmit and receive data on rare occasions and to remain in a low power mode of operation for relatively long periods of time between the transmission and reception events.

With regard to the use of stations to backhaul sensor and meter data, the 802.11ah standard provides a backhaul link to support the traffic from the sensors embodied by the stations and to stream images or other traffic. In this case, the access point can aggregate multiple remote input/output points. With regard to the use of stations to extend the range of wi-fi, an access point operating in accordance with the 802.11ah standard may provide for an extended range hotspot, such as for use at home, on a campus or within a shopping mall, and may serve to offload traffic from a cellular or other network.

The above three example use cases each have different characteristics and requirements. For example, the three use cases have different requirements in terms of traffic load ranging from relatively low data rates in instances in which the stations serve as sensors or meters to relatively high data rates in instances in which the stations serve to extend the range of wi-fi and to offload traffic from a cellular or other network. The three use cases also have different characteristics in terms of traffic type, such as by supporting traffic having a bursty characteristic in an instance in which the station serves to extend the range of wi-fi by offloading traffic from a cellular or other network in comparison to supporting traffic having a relatively low duty cycle in an instance in which a station serves as a sensor or meter that may only provide data on an hourly or daily basis. The three use cases may also have different sleeping requirements, may place the stations in different environments, such as rural environments, urban environments, suburban environments, home environments, etc., and may support different data rates ranging, for example, from 10 Mbps for a station that serves to extend the range of an outdoor hotspot to 100 kbps for a station that serves as a sensor or a meter.

An access point may have multiple modes of operation, such as a sensor only mode in which the access point only supports stations configured as sensors and meters, an offload only mode in which the access point only supports stations configured to offload traffic from a cellular or other network only or a mixed mode in which the access point supports a variety of different types of stations including stations that serve as sensors and meters and stations that serve to offload traffic from a cellular or other network. The access point may advertise its mode in the beacon and probe response frames. Once the access point has advertised its mode of operation, the station may associate with an access point that serves a particular type of station. For example, a station that serves as a sensor may wish to associate with an access point that is operating in a sensor only mode or a mixed mode, but may not wish to associate with an access point that is operating in an offload only mode.

In order to support communication between the access point and the stations, a period of time termed a restricted access window (RAW) may be defined. The RAW is divided into a plurality of time slots and only certain stations may access the wireless medium during the respective slots. The access point may assign stations to the different time slots using a function. This function may depend on the association identification (AID) of the station, among other parameters. Further details are provided by IEEE 802.11-12/0831r0 and IEEE 802.11-12/1321r0. In this regard, a station-slot mapping function f(x) as set forth by IEEE 802.11-12/1321r0 may be employed to allocate stations to slots of the RAW. The station-slot mapping function f(x) may be defined to equal $(x+N_{offset})$ mod $N_{RAW}=i$ with the result i being the slot index assigned to a respective station. The slot index identifies the slot within the RAW to which the respective station is assigned. In an instance in which the RAW is for both paged and unpaged stations, x may be the AID of a station. However, in an instance in which the RAW is restricted to only the paged stations, x may be the position index of a paged station among all paged stations when sequentially arranged based upon their AIDs. For example, in an instance in which the stations are sequentially arranged based upon their AIDs and there are n paged stations prior to the paged station in question, x may equal n assuming the first paged station's bit position is defined to be x=0. Additionally, $N_{offset}$ is an offset value in the mapping function that is provided to address fairness among the stations indicated in the traffic indication map (TIM). The offset may be provided by an existing field of the beacon, such as the time stamp, frame check sequency (FSC) or the like. Additionally, mod X indicates a modulo X operation.

In an instance in which the access point operates in a sensor only mode or a offload only mode, the AID assignment function may correctly allocate the stations to the RAW slots since each station assigned to a respective slot will be the same type of station, such as a station serving as a sensor or a station supporting offloading. However, in an instance in which the access point operates in a mixed mode, the access point and its AID assignment function cannot distinguish between the AIDs of different types of stations, such as stations that serve as sensors and stations that support offloading. As such, different types of stations may be assigned to the same slot of the RAW. The assignment of different types of stations to the same slot may create issues as the different types of stations may have different traffic requirements and characteristics. For example, in an instance in which a station that serves as a sensor is allocated to the same slot in the RAW as stations that serve to offload traffic, the station that serves as a sensor may never have an opportunity to transmit its sensor data since the duration of the slot may be fully consumed by the station that serves to offload traffic.

An access point that operates in a mixed mode may initially endeavor to allocate the same type of stations to the same slot within the RAW by, e.g., trying to assign AIDs to the slots in an intelligent fashion so that the AID assignment function would allocate the same type of stations in the same slot and prohibit different types of stations from accessing the same slot. However, this assignment process can be complicated, especially since the AIDs can be assigned based on the sleeping requirements of the stations. The existence of two constraints, based on the sleeping requirements and on the station type, that need to be combined for the AID assignment makes the process employed by the access point complicated. Additionally, the assignment of stations of the same type to the slots of the RAW may also be challenging in an instance in which the number of slots in the RAW changes since the station-slot mapping function f(x) would also change. Every time that the number of slots changes the access point would need to reassign the AIDs to the stations to guarantee that the same type of stations are allocated to the same slot. This reallocation process may be prohibitively resource intensive since the access point would need to communicate with each of the stations, which may number in the thousands in some instances.

The beacon transmitted by an access point may include a set of parameters for the RAW access. This set of parameters is called the RAW parameter set. Further details are provided by IEEE 802.11-12/843r0. Although the RAW parameter set defines various aspects of the RAW, the stations that may access the current RAW is determined by the current page segment of the traffic indication map (TIM). Furthermore, the mapping function of the access point that assigns the stations to slots in the RAW may take into account if the stations are paged in the TIM or not, but is completely independent of the type of station. Thus, different types of stations may be assigned to the same slot in an instance in which an access point operates in a mixed mode which may, in turn, create difficulties for at least some of the stations to communicate with the access point.

SUMMARY

A method, apparatus and computer program are provided in accordance with embodiments to facilitate the assignment of stations to the slots of the RAW so as to support communications between the stations and an access point. For example, the method, apparatus and computer program of an example embodiment may assign the same type of stations to a respective slot in the RAW such that each station may communicate with the access point. Additionally, the method, apparatus and computer program of an embodiment may allocate the slots of the RAW to different types of stations in such a manner that the stations may operate efficiently, such as by sleeping during the slots that are allocated to a different type of station. As such, the method, apparatus and computer program of an embodiment may facilitate communications between an access point and different types of stations in an efficient manner by taking into account the type of station in conjunction with the assignment of the station to a respective slot in the RAW.

In accordance with a first aspect of the present invention there is provided a method for use in an access point, the method comprising causing a broadcast message to be provided to one or more stations, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station, and providing access for one or more stations of the type that was indicated within the slots of the RAW, following provision of the broadcast message.

In accordance with a second aspect of the present invention there is provided an apparatus for use in an access point, the apparatus comprising a processing system configured to cause the apparatus at least to cause a broadcast message to be provided to one or more stations, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station and provide for access for one or more stations of the type that was indicated within the slots of the RAW, following provision of the broadcast message. The processing system may for example comprise at least one processor and at least one memory including computer program code.

In accordance with a third aspect of the present invention there is provided a computer program comprising a set of instructions which, when executed on an access point, cause the access point to perform causing a broadcast message to be provided to one or more stations, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station, and providing for access for one or more stations of the type that was indicated within the slots of the RAW, following provision of the broadcast message. The computer program may comprise a computer program product, for example embodied by a computer readable medium.

In accordance with a fourth aspect of the present invention there is provided a method for use in a station, the method comprising receiving a broadcast message from an access point, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station, and determining whether the RAW is accessible and, in an instance in which the RAW is accessible, the slot of the RAW to be utilized.

In accordance with a fifth aspect of the present invention there is provided apparatus for use in a station, the apparatus comprising a processing system configured to cause the apparatus at least to receive a broadcast message from an access point, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station, and determine whether the RAW is accessible and, in an instance in which the RAW is accessible, the slot of the RAW to be utilized. The processing system may for example comprise at least one processor and at least one memory including computer program code.

In accordance with a sixth aspect of the present invention there is provided a computer program comprising a set of instructions which, when executed on a station, cause the station to perform receiving a broadcast message from an access point, wherein the broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station, and determining whether the RAW is accessible and, in an instance in which the RAW is accessible, the slot of the RAW to be utilized. The computer program may comprise a computer program product, for example embodied by a computer readable medium.

In an embodiment, an apparatus for use in an access point is provided that includes means for causing a broadcast message to be provided to one or more stations. The broadcast message includes an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station. The apparatus of this embodiment also includes means for providing for access for one or more stations of the type that was indicated within the slots of the RAW, following provision of the broadcast message.

In an embodiment, an apparatus for use in a station is provided that includes means for receiving a broadcast message from an access point. The broadcast message comprises an indication of a type of stations to access a restricted access window (RAW) and one or more of a duration of one or more slots in the RAW allocated to a first type of station, a duration of the RAW allocated to the first type of station, a duration of one or more slots in the RAW allocated to a second type of station or a duration of the RAW allocated to the second type of station. The apparatus of this embodiment also includes means for determining whether the RAW is accessible and, in an instance in which the RAW is accessible, the slot of the RAW to be utilized.

Further features and advantages of the invention will become apparent from the following description of preferred embodiments of the invention, given by way of example only, which is made with reference to the accompanying drawings.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors or a processing system) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program are provided in accordance with an embodiment of the present invention in order to assign stations 10 to slots within a restricted access window (RAW) in a manner that takes into account the type of station. As such, the method, apparatus and computer program product of an example embodiment may assign the same type of stations to a respective slot of the RAW in order to facilitate communications between an access point 12 and the stations. In an instance in which the RAW includes one or more slots for supporting communications with a first type of station and one or more slots for supporting communications with a second, different type of station, the method, apparatus and computer program of an example embodiment may configure the slots within the RAW in such a manner that a certain type of station may efficiently communicate with the access point, such as by sleeping (i.e. operating in a sleep mode) during the slots assigned to a different type of station.

Figure 1:
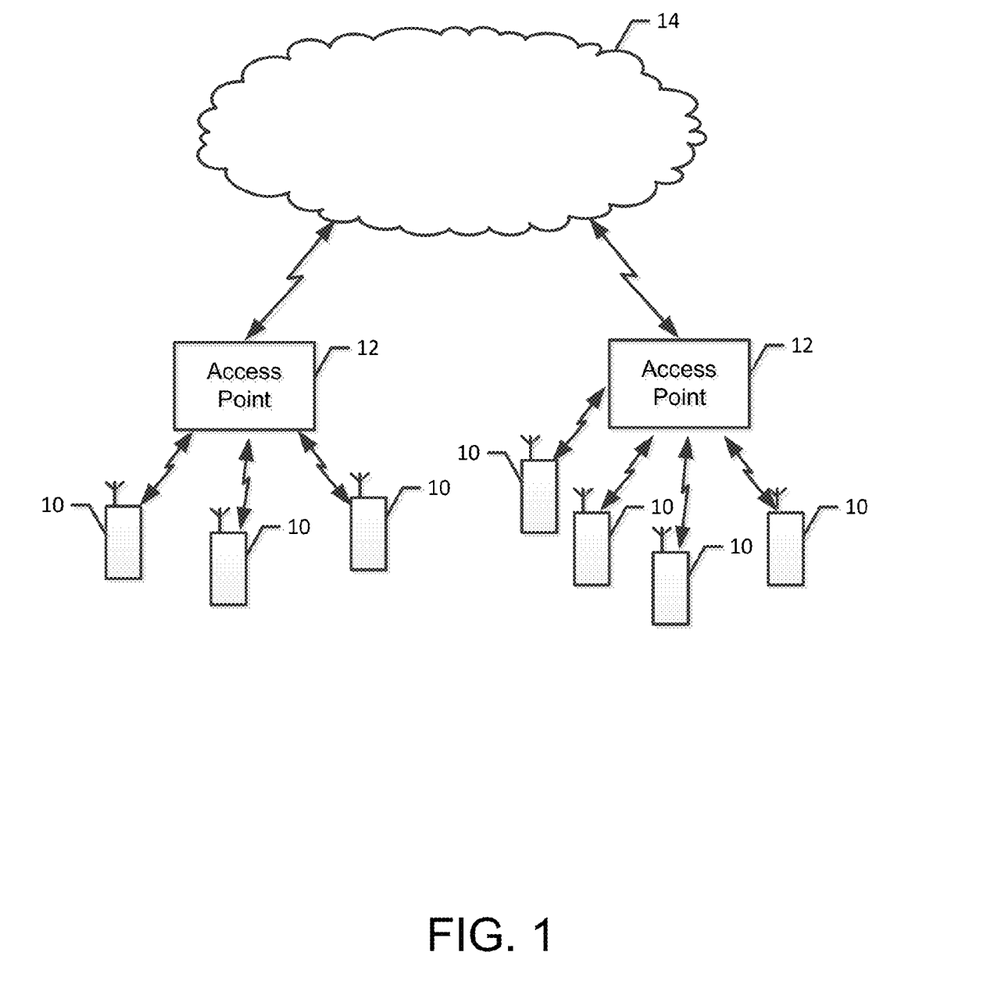
FIG. 1 is a schematic representation of a system that supports communications between access points and stations in accordance with an embodiment of the present invention.

Referring now to FIG. 1, which illustrates an example system that supports communications between a plurality of stations 10 and one or more access points 12, each access point may communicate with one or more stations and, in one embodiment, may communicate with a large number of stations, such as for example 6,000 or more stations. The access points may, in turn, communicate with a network 14. While the access points may communicate via an LTE or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah standard, wireless local access network (WLAN), Worldwide Interoperability for Microwave Access (WiMAX) protocols, universal mobile telecommunications systems (UMTS) terrestrial radio access network (UTRAN) and/or the like.

The access points 12 and the stations 10 may communicate via wireline communications, but most commonly communicate via wireless communications. For example, the access points and the stations may communicate in a sub 1 GHz band as defined by IEEE 802.11ah standard. The access point may be embodied by any of a variety of network entities, such as an access point, a base station, a Node B, an evolved Node B (eNB), a radio network controller (RNC) or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals, such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of wi-fi or another wireless local area network (WLAN), such as by extending the range of a hotspot, and to offload traffic that otherwise would be carried by a cellular or other network.

Figure 2:
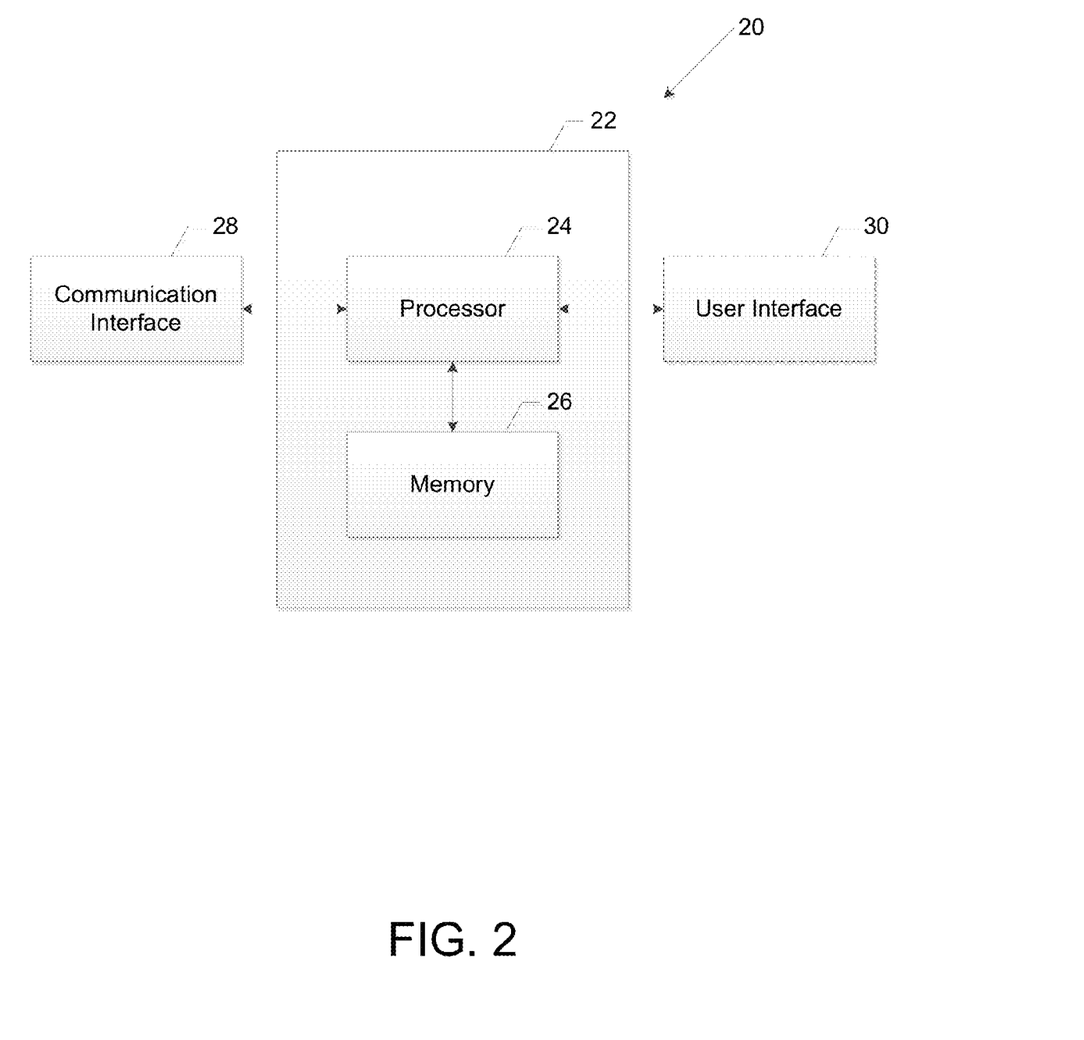
FIG. 2 is a block diagram of an apparatus that may be embodied by an access point or a station and that may be specifically configured in accordance with an embodiment of the present invention.

The access point 12 and/or the station 10 may be embodied as or otherwise include an apparatus 20 that is specifically configured to perform the functions of the respective device, as generically represented by the block diagram of FIG. 2. While the apparatus may be employed, for example, by an access point or a station, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing circuitry 22 that is configurable to perform actions in accordance with embodiments described herein. The processing circuitry may be configured to perform data processing, application execution, signal processing, measurements and report generation, and/or other processing and management services according to an embodiments of the present invention. In some embodiments, the apparatus or the processing circuitry may be embodied as a chip or chip set. In other words, the apparatus or the processing circuitry may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein. Alternatively or additionally, a processing system may be embodied by or have similar functionality to the processing circuitry.

In an embodiment, the processing circuitry 22 includes a processor 24 and memory 26 that may be in communication with or otherwise control a communication interface 28 and, in some cases, a user interface 30. As such, the processing circuitry may be embodied as a circuit chip (e.g. an integrated circuit chip) configured (e.g. with hardware, software or a combination of hardware and software) to perform operations described herein. However, in some embodiments, the processing circuitry may be embodied as a portion of the mobile terminal 10.

The user interface 30 (if implemented) may be in communication with the processing circuitry 22 to receive an indication of a user input at the user interface and/or to provide an audible, visual, mechanical or other output to the user. In this regard, the user interface and/or the processing circuitry 22 may include user interface circuitry configured to facilitate user control of at least some functions based upon user input. The user interface may include, for example, a keyboard, a mouse, a trackball, a display, a touch screen, a microphone, a speaker, and/or other input/output mechanisms. The apparatus 20 need not always include a user interface.

The communication interface 28 may include one or more interface mechanisms for enabling communication with other devices and/or networks, such as for enabling communication between an access point 12 and a station 10 or between two or more stations. In some cases, the communication interface may be any means such as a device or circuitry embodied in either hardware, or a combination of hardware and software that is configured to receive and/or transmit data from/to a network and/or any other device or module in communication with the processing circuitry 22. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with embodiments of the present invention. For example, the memory may be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an application specific integrated circuit (ASIC), a field programmable gate array (FPGA), or the like. In an embodiment, the processor may be configured to execute instructions stored in the memory 26 or otherwise accessible to the processor. As such, whether configured by hardware or by a combination of hardware and software, the processor may represent an entity (e.g. physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
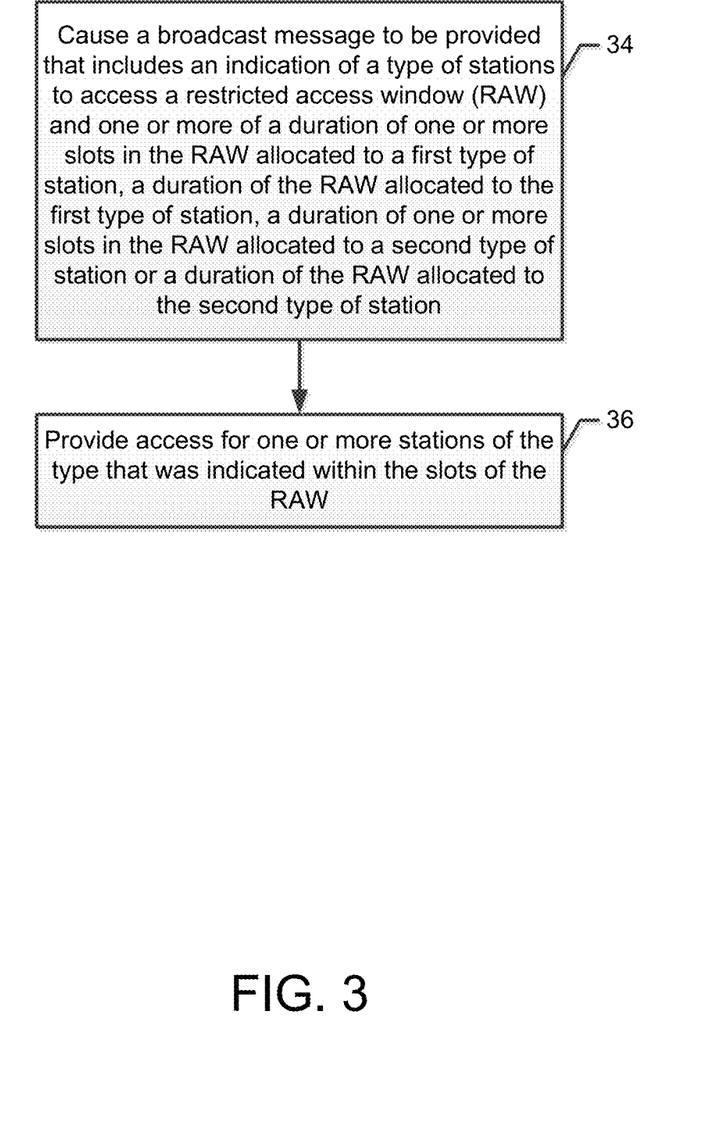
FIG. 3 is a flow chart illustrating operations performed, such as by the apparatus of FIG. 2 embodied by an access point, in accordance with an embodiment of the present invention.
Figure 4:
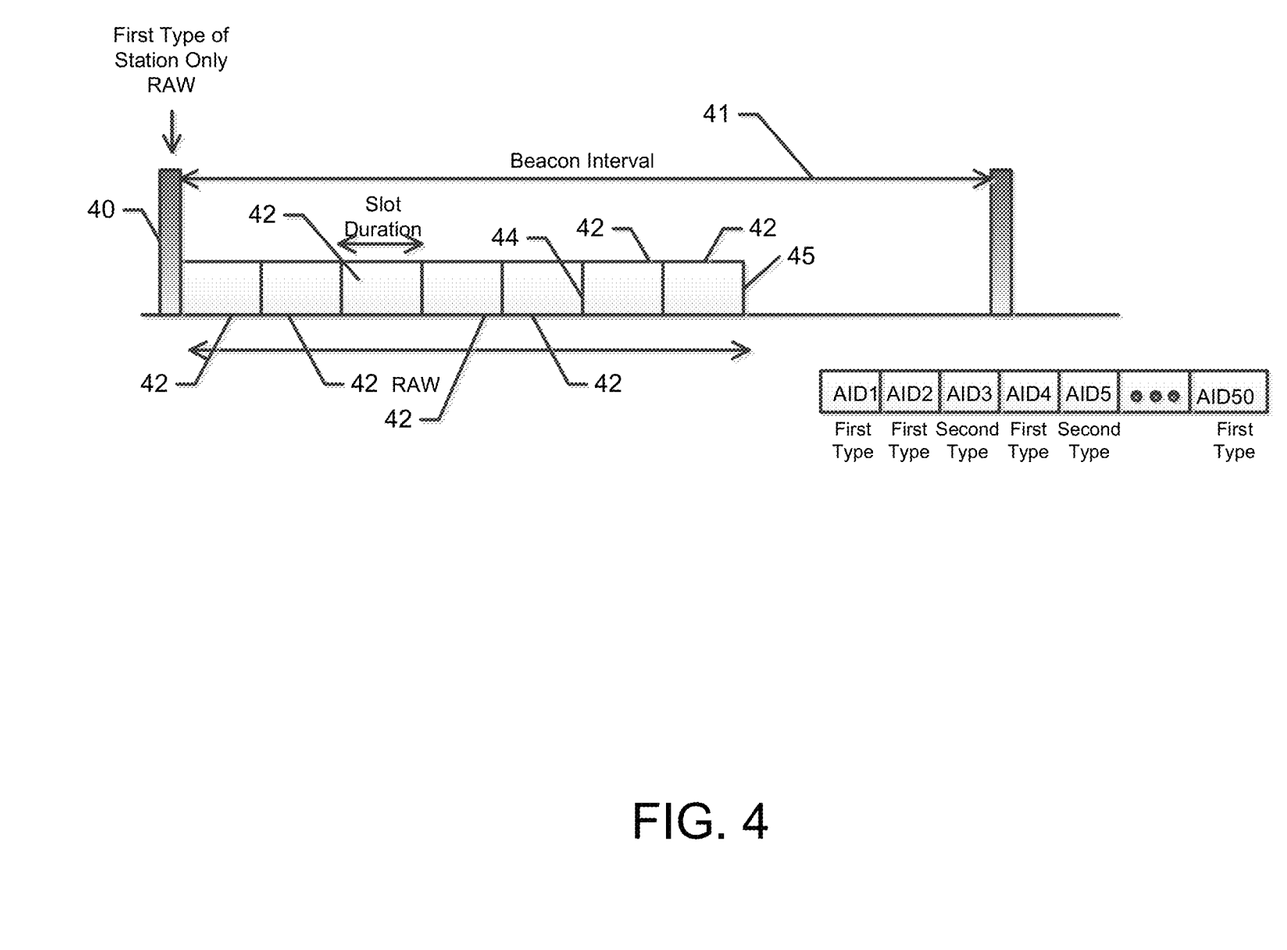
FIG. 4 is a representation of a RAW having slots allocated to a first type of station in accordance with an embodiment of the present invention.

Referring now to FIG. 3, the operations performed by an apparatus 20, such as illustrated in FIG. 2, embodied by an access point 12 are illustrated and will be hereinafter described. Referring now to block 34 of FIG. 3, the apparatus may include means, such as the processing circuitry 22, the processor 24, the communication interface 28 or the like, for causing a broadcast message, such as a beacon, to be provided to one or more stations 10. As shown in FIG. 4, the beacon 40 (or 'beacon signal') may define the RAW and the slots of the RAW within which the stations communicate with the access point. In order to facilitate the allocation of slots of the RAW to two or more types of stations, the broadcast message, such as the beacon, may include an indication of the type of stations to access the RAW and may include one or more of: (i) a duration of the slot(s) in the RAW allocated to a first type of station, (ii) a duration of the RAW allocated to the first type of station, (iii) a duration of the slot(s) in the RAW allocated to a second type of station or (iv) a duration of the RAW allocated to the second type of station. For example, the broadcast message may include each of the foregoing parameters and, in some embodiments, may optionally include one or more additional parameters as described below. By way of example, but not of limitation, the broadcast message of one embodiment may include information regarding the type of stations that are allocated to the initial slots of the RAW and the type of stations that are allocated to the latter slots of the RAW, as will be described below.

With regard to the indication of the type of station 10 to access the slots of the RAW, the indication may indicate if stations that serve only as sensors can access the RAW (such as in an instance in which the access point 12 is operating in a sensor only mode), if stations embodied by mobile terminals and that support offloading of traffic otherwise transmitted by cellular or other networks can support the RAW (such as an instance in which the access point is operating in an offload only mode), or if the RAW supports communications with two or more different types of stations, such as stations that serve only as sensors and stations that are embodied by mobile terminals to support offloading (such as in an instance in which the access point is operating in a mixed mode). Alternatively, a RAW serving only specific type of station can be defined if the access point determines to implement a mixed type of RAW through the use of two separate RAWs, one dedicated to each particular type of device, as described below. Although stations that serve only as sensors and stations that are embodied by mobile terminals to support offloading are described herein, these types of stations are provided by way of example and not of limitation as the access point may communicate with other types of stations in other embodiments.

As noted above, the broadcast message may define the duration of the RAW allocated to at least one type of station 10. The durations may be expressed in various manners including in terms of time units. In an instance in which the slots of the RAW are all dedicated to a single type of station, the duration of the RAW that is provided by the broadcast message may also serve as a duration of the RAW allocated to at least one type of station since stations of the at least one type may utilize all slots of the RAW. In an instance in which the access point 12 operates in a mixed mode, however, the broadcast message may include the duration of the RAW allocated to each type of station, such as both the first and second types of stations in which the access point communicates with two types of stations. With regard to stations that serve as sensors or meters, for example, the broadcast message may include a duration $T_{SENS}$ of the RAW allocated to the station that serve as sensors or meters. Additionally or alternatively, in an instance in which some of the slots are assigned to stations that are embodied by mobile terminals for offloading purposes, the duration $T_{MOB}$ of the RAW allocated to the stations embodied by mobile terminals may be provided. As described above, the duration of the RAW allocated to each type of station may be provided. Alternatively, in an instance in which the slots of the RAW are allocated to two different types of stations, such as first and second types of stations, the duration $T_{RAW}$ of the RAW and the duration of the RAW allocated to only the first type of station need to be provided with the stations of the second type being able to determine the duration of the RAW allocated to the second type of station based upon the difference between the duration of the RAW and the duration of the RAW allocated to the first type of station, such that the combination of the duration of the RAW and the duration of the RAW allocated to the first type of station serves as the duration of the RAW allocated to the second type of station in this embodiment. Although described above in the context of a RAW having slots allocated to two types of stations, the RAW may include slots allocated to three or more types of stations, in which case the broadcast message may include the duration of the RAW allocated to each type of station. Similarly in that case, the duration of the RAW allocated to one type of station, such as the last type of station, can be computed by the combination of the duration of the RAW and the duration of the RAWs allocated to the other types of stations.

Further, the broadcast message may define the duration of the slots in the RAW allocated to the first type of station and the duration of the slots in the RAW allocated to the second type of station. Although the slots allocated to the first and second types of stations may have the same duration, the slots allocated to the first and second types of stations may have different durations in some embodiments.

The broadcast message of one embodiment may optionally include the number of slots in the RAW $N_{RAW}$. Similarly, the broadcast message of one embodiment may optionally include the number of slots allocated to at least one type of station 10. For example, $N_{SENS}$ may represent the number of slots in the RAW that are allocated to stations that serve as sensors and/or $N_{MOB}$ may represent the number of slots in the RAW that are allocated to stations that are embodied by mobile terminals for offloading purposes. In an instance in which a RAW is dedicated to one type of station, such as an instance in which all of the slots of a RAW are allocated to stations that serve as sensors or in which all of the slots of a RAW are allocated to stations that are embodied by mobile terminals for offloading purposes, the number $N_{RAW}$ of slots in the RAW may also serve as the number of slots allocated to the respective type of station since each slot in the RAW will be allocated to the same type of station. In an instance in which the access point 12 operates in a mixed mode so as to allocate some slots within the RAW to a first type of station and other slots within the same RAW to a second type of station, however, the broadcast message may include the number of slots allocated to each type of station. Alternatively, in an instance in which the slots of the RAW are allocated between two different types of stations, such as first and second types of stations, the RAW parameter set may include the number of slots allocated to only the first type of station and the stations of the second type may, in turn, determine the number of slots allocated to the second type of station based upon the difference between the number $N_{RAW}$ of slots in the RAW and the number of slots allocated to the first type of station. As indicated above, the indication of the number of slots in the RAW may be optional as the number of slots in the RAW may be determined by dividing the duration of the RAW (for a particular type of station) by the duration of the slot (for the particular type of station). In an instance in which the number of slots in the RAW $N_{RAW}$ and the number of slots allocated to individual types of stations are indicated, the respective RAW duration may be omitted as the duration can be calculated by multiplying the number of slots by the slot duration (for each device type and for the whole RAW).

The broadcast message, such as the beacon, may include a RAW parameter set. As set forth by IEEE 802.11-12.1321r0, the RAW parameter set may be an information element (IE) that includes a plurality of fields. By way of example, but not of limitation, the fields of a RAW parameter set may include a page identification (ID) that indicates the page index for hierarchical AIDs of the allocated group of stations, a block offset indicating the starting block index of the allocated group of stations, a block range indicating the number of blocks commencing from the block offset for the allocated group of stations, a RAW start time indicating the duration in time units (TUs) from the end of the beacon transmission to the RAW start time, a RAW duration indicating the duration of the RAW in time units, a flag indicating whether access to the RAW is restricted to paged stations only or not, an indication regarding whether there will be a resource allocation frame which indicates whether the stations need to wake up at the beginning of the RAW to receive group addressed frames such as for resource allocation and a slot definition including, for example, signaling related to the slot duration, slot assignment to the stations and an indication as to whether cross boundary transmissions are allowed or not. In an embodiment, the broadcast message, such as the beacon, may optionally include within the RAW parameter set the indication of the type of stations to access the RAW and may include one or more of: (i) a duration of the slot(s) in the RAW allocated to a first type of station, (ii) a duration of the RAW allocated to the first type of station, (iii) a duration of the slot(s) in the RAW allocated to a second type of station or (iv) a duration of the RAW allocated to the second type of station.

As shown in FIG. 4, which is a representation of a RAW 45 having slots 42 allocated to a first type of station 10 in accordance with an example embodiment of the present invention, a beacon 40 may be provided by an access point 12 and may define a RAW having a plurality of slots. Each slot 42 may have a respective duration and adjacent slots may be separated by a slot boundary 44. The slots may have the same duration. Alternatively, the slots may have different durations, such as with the slots supporting stations embodied as mobile terminals for offloading traffic having longer durations for allowing longer data exchange than the stations embodied as a sensor or a meter. In either instance, the beacon of this embodiment may define the durations of the slots supporting different types of stations. In an instance in which the stations 10 that are in communication with the access point are of a plurality of different types, such as first and second types, the beacon and, in one embodiment, the RAW parameter set, such as the page ID, the block offset and the block range, may define which of the stations belong to the current block and will communicate via the respective slots of the RAW. In an instance in which the RAW parameter set indicates that the slots are each assigned to the first type of station, such as shown in FIG. 4, only those stations that are of the first type, such as the stations having AIDs of a AID 1, AID 2, AID 4, . . . AID 50, will be assigned to slots of the RAW with the stations of the second type, such as the stations having AIDs of AID 3, AID 5 . . . , being unable to communicate via the slots of the RAW. In one embodiment, the stations of the first type may determine the slot within the RAW to which they are assigned in various manners including by a station-slot mapping function f(x) as described by IEEE 802.11-12/1321r0. In this regard, the station-slot mapping function f(x) may be defined to equal $(x+N_{offset})$ mod $N_{RAW}$=i with the result i being the slot index assigned to a respective station, as described above.

Figure 5:
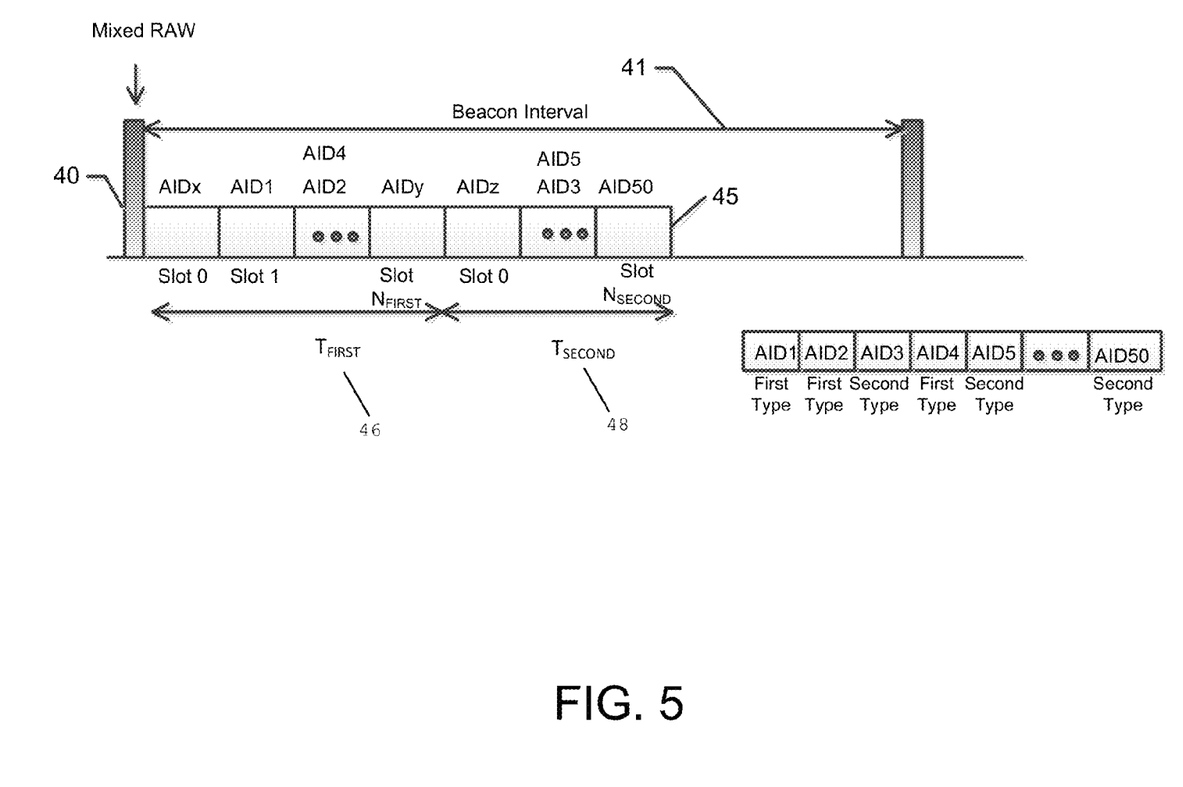
FIG. 5 is a representation of a RAW having slots allocated to first and second types of stations by an access point operating in a mixed mode in accordance with an embodiment of the present invention.

Referring now to FIG. 5, a beacon 40 is illustrated that indicates that the access point 12 operates in a mixed mode with subsets of the slots of the RAW 45 allocated to different types of stations 10. For example, in an embodiment in which the access point is configured in the mixed mode to communicate with first and second types of stations, some slots of the RAW may be allocated to the first type of station and other slots of the RAW may be allocated to the second type of station. The type of stations that are allocated to the initial slots of the RAW and the type of stations that are allocated to the latter slots of the RAW may be indicated by the broadcast message, such as the beacon. As illustrated, the slots allocated to a first type of station may be grouped together and the slots allocated to a second type of station may be grouped together, such as with the slots allocated to a first type of station being consecutive and preceding the slots allocated to the second type of station. As shown, the duration of the RAW may therefore be divided into a first portion $T_{FIRST}$ 46 associated with the first type of station and a second portion $T_{SECOND}$ 48 associated with the second type of station. The first type of stations may then be assigned to slots allocated to the first type of station and second type of stations may be assigned to the slots allocated to the second type of station with the allocation performed, for example, in the manner described above utilizing the station-slot mapping function f(x). For example, one assignment of AIDs of the stations to the respective slots is depicted in FIG. 5. The stations may determine, in advance, the slots of the RAW to which they will be allocated, based on their type, to provide additional sleeping capabilities.

Alternatively, an access point 12 operating in a mixed mode to communicate with first and second types of stations 10 may define two RAWs, one that is dedicated to communication with the first type of station and the other that is dedicated to communication with the second type of station. In this embodiment in which the first type of station includes stations embodied by sensors or meters and the second type of station includes stations embodied by mobile terminals, the duration of one RAW $T_{RAW1}$ may equal the duration of the RAW for sensors $T_{SENS}$ and the duration of the other RAW $T_{RAW2}$ may equal the duration of the second type of stations $T_{MOB}$.

Once the stations 10 have been assigned to respective slots within the RAW, the apparatus 20 embodied by the access point 12 may include means, such as the processing circuitry 22, the processor 24, the communications interface 28 or the like, for providing access for one or more stations of the type that is indicated within the slots of the RAW. See block 36 of FIG. 3. For example, the access point may communicate with stations of the first type within slots of the RAW allocated to stations of the first type and may communicate with stations of the second type within slots allocated to stations of the second type. By allocating stations of the same type to a slot, the communication between the access point and the stations may proceed more efficiently as the stations allocated to respective slot may have more similar characteristics and requirements since they are of the same type.

Figure 6:
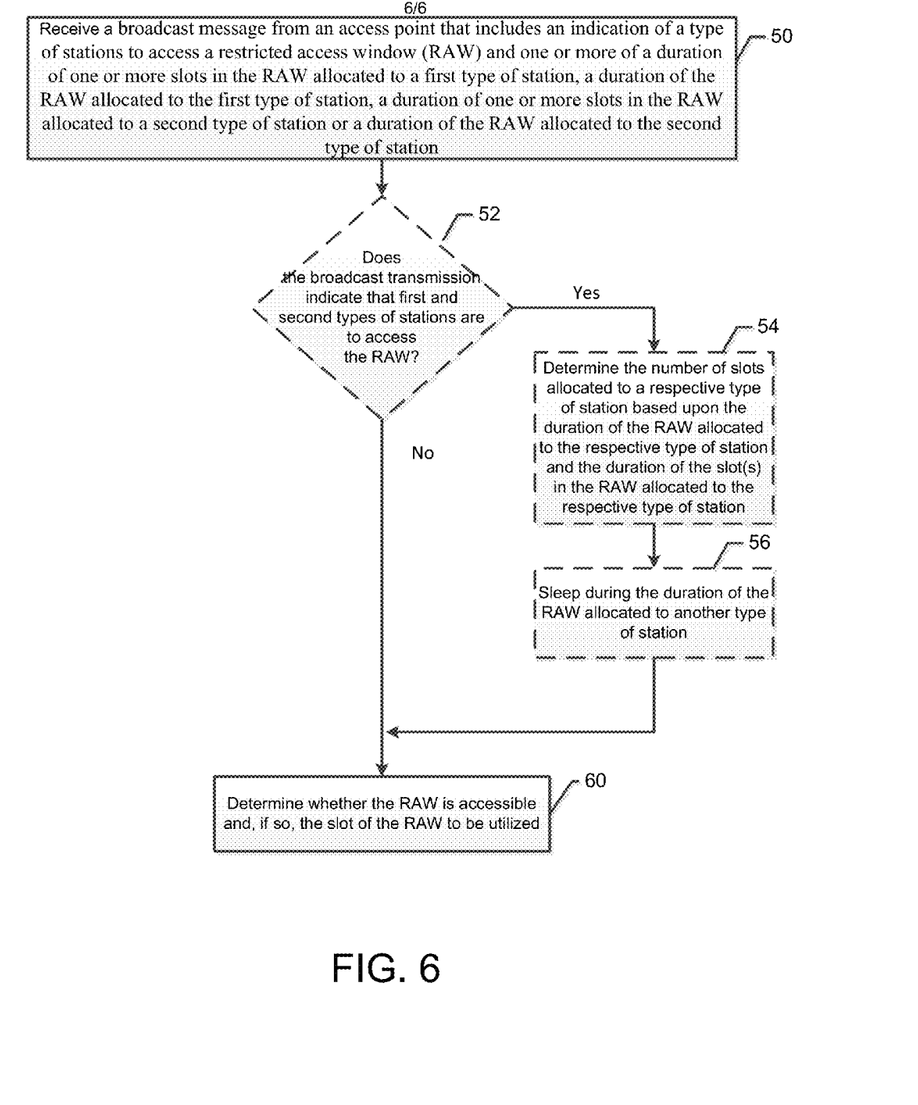
FIG. 6 is a flow chart illustrating operations performed, such as by the apparatus of FIG. 2 embodied by a station, in accordance with an embodiment of the present invention.

FIG. 6 illustrates a flow chart for operations performed by the apparatus 20, such as shown in FIG. 2, embodied by a station 10, in accordance with an embodiment of the present invention. As shown in block 50 of FIG. 6, the apparatus embodied by a station may include means, such as the processing circuitry 22, the processor 24, the communications interface 28 or the like, for receiving a broadcast message, such as a beacon 40, from an access point 12. As described above, the broadcast message of an embodiment of the present invention, such as the beacon and, in one embodiment, the RAW parameter set of the beacon, may include an indication of a type of stations to access a RAW and one or more of a duration of one or more slots in the RAW allocated to a first type of station, a duration of the RAW allocated to the first type of station, a duration of one or more slots in the RAW allocated to a second type of station or a duration of the RAW allocated to the second type of station. As described above, the broadcast message may optionally provide one or more additional parameters relating to the RAW and the allocation of the slots of the RAW. As shown in block 52 of FIG. 6, the apparatus embodied by the station may also include means, such as the processing circuitry, the processor or the like, for determining whether the broadcast message indicates that a plurality of types of stations are to access the RAW, such as in an instance in which first and second different types of stations are to access the RAW. If not, the slots of the RAW will all be allocated to one type of station such that the access point operates in a sensor only mode, an offloading only mode or the like. As shown in block 60, the apparatus embodied by the station may also include means, such as the processing circuitry, the processor or the like, for determining whether the RAW is accessible and, in an instance in which the RAW is accessible, the slot of the RAW to be utilized. In this regard, the RAW may be considered accessible in an instance in which the RAW includes slots allocated to the type of station that is making the determination. If the RAW is accessible, the apparatus, such as the processing circuitry, the processor or the like, may determine the slot to be utilized in various manners including the utilization of a station-slot mapping function f(x) as described above.

However, in an instance in which the access point 12 operates in a mixed mode such that the broadcast message indicates that a plurality of types of stations 10, such as first and second different types of stations, are to access the RAW, the broadcast message may also include an indication of the order in which the slots of the RAW are allocated to the different types of stations. With reference to FIG. 5, for example, the indication may be such that the slots allocated to the first type of station precede the slots allocated to the second type of station within the RAW. In this embodiment, the apparatus, such as the processing circuitry, the processor or the like, may determine the slot of the RAW to be utilized based upon the order in which the slots of the RAW are allocated.

In an instance in which the broadcast message indicates that a plurality of types of stations 10, such as both first and second types of stations, are to access the RAW, the apparatus 20 may include means, such as the processing circuitry 22, the processor 24 or the like, for determining the number of slots allocated to each respective type of station based upon the duration of the RAW allocated to the respective type of station and the duration of the slot(s) in the RAW allocated to the respective type of station, e.g. by dividing the duration of the RAW allocated to the respective type of station by the duration of the slot(s) in the RAW allocated to the respective type of station. See block 54 of FIG. 6. Alternatively, the broadcast message may include not only the duration of the RAW allocated to the respective type of station and the duration of the slot(s) in the RAW allocated to the respective type of station, but also the number of slots allocated to the respective types of station.

In one embodiment in which the broadcast message indicates that a plurality of types of stations 10, such as first and second different types of stations, are to access the RAW, the apparatus 20 embodied by the station may also include means, such as the processing circuitry 22, the processor 24 or the like, for sleeping, such as by entering a mode of operation that consumes less power, during the duration of the RAW allocated to another type of station. See block 56 of FIG. 6. In this regard, the plurality of stations of all various types may listen for the broadcast message, such as the beacon 40, in order to receive the information regarding the RAW and the allocation of the slots of the RAW. Thereafter, a first type of station may sleep during the portion of the RAW allocated to a second type of station. Conversely, a second type of station may sleep during the portion of the RAW allocated to the first type of station. Although the slots allocated to the different types of stations may be ordered in various manners, the slots allocated to the stations embodied as sensors or meters may precede the slots allocated to stations embodied as mobile terminals in one embodiment since the stations embodied as sensors or meters may be greater sleeping requirements. In an example embodiment, the broadcast message, such as the beacon, may provide an indication of the order in which the portions of the RAW allocated to the different types of stations are positioned. As such, the allocation of the slots to respective types of stations and the segregation of the slots to which stations of the same type are allocated may facilitate the energy efficient operation of the stations, while ensuring that the stations have an opportunity to communicate with the access point 12, such as by determining whether the RAW is accessible and, in an instance in which the RAW is accessible, the slot of the RAW to be utilized, as described above and illustrated in block 60.

FIGS. 3 and 6 illustrate example operations performed by a method, apparatus and computer program, such as apparatus 20 of FIG. 2 as embodied by an access point 12 and a station 10, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' blocks. As such, the operations of FIGS. 3 and 6, when executed, convert a computer or processing circuitry into a particular machine configured to perform embodiments of the present invention. Accordingly, the operations of FIGS. 3 and 6 define an algorithm for configuring a computer or processing circuitry 22, e.g. processor, to perform an example embodiment. In some cases, a general purpose computer may be provided with an instance of the processor which performs the algorithm of FIGS. 3 and 6 to transform the general purpose computer into a particular machine configured to perform an embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example, by the blocks having a dashed outline in FIG. 6. It should be appreciated that each of the modifications, optional additions or amplifications below may be included with the operations above either alone or in combination with any others among the features described herein.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for use in an access point, the method comprising:

causing, with circuitry, a broadcast message to be provided to one or more stations, the broadcast message including an indication of a type of stations to access a restricted access window (RAW), an indication of a number of slots in the RAW assigned to each type of station when more than one type of station access the RAW, and one or more of:

a duration of one or more slots in the RAW allocated to a first type of station, a duration of the RAW allocated to the first type of station, and a duration of one or more slots in the RAW allocated to a second type of station or a duration of the RAW allocated to the second type of station; and providing, with the circuitry, access for one or more stations of the type that was indicated within the slots of the RAW, following provision of the broadcast message, wherein a station of the first type calculates a number of slots allocated to the first type of stations based on a total number of slots in the RAW and a number of slots in the RAW allocated to stations of a type other than the first type, and the station of the first type transmits in one of the number of slots allocated to the first type.

2. The method according to claim 1 wherein, in an instance in which the indication of the type of stations indicates that different types of stations are to access the RAW, the broadcast message further comprises an indication of an order in which the slots of the RAW are allocated to the different types of stations.

3. The method according to claim 1, wherein causing a broadcast message to be provided comprises causing a beacon to be sent, wherein the beacon includes a RAW parameter set, and wherein the indication of the type of stations to access the RAW and one or more of the duration of one or more slots in the RAW allocated to the first type of station, the duration of the RAW allocated to the first type of station, the duration of one or more slots in the RAW allocated to the second type of station or the duration of the RAW allocated to the second type of station are included within the RAW parameter set.

4. The method according to claim 1, wherein one type of station is configured as a sensor or meter and another type of station is embodied as a mobile terminal and configured to offload traffic from another network.

5. An apparatus for use in an access point, comprising: circuitry configured to cause a broadcast message to be provided to one or more stations, the broadcast message including an indication of a type of stations to access a restricted access window (RAW), an indication of a number of slots in the RAW assigned to each type of station when more than one type of station access the RAW, and one or more of:

a duration of one or more slots in the RAW allocated to a first type of station, a duration of the RAW allocated to the first type of station, and a duration of one or more slots in the RAW allocated to a second type of station or a duration of the RAW allocated to the second type of station; and provide for access for one or more stations of the type that was indicated within the slots of the RAW, following provision of the broadcast message, wherein a station of the first type calculates a number of slots allocated to the first type of stations based on a total number of slots in the RAW and a number of slots in the RAW allocated to stations of a type other than the first type, and the station of the first type transmits in one of the number of slots allocated to the first type.

6. The apparatus according to claim 5 wherein, in an instance in which the indication of the type of stations indicates that different types of stations are to access the RAW, the broadcast message further comprises an indication of an order in which the slots of the RAW are allocated to the different types of stations.

7. The apparatus according to claim 5, wherein the broadcast message comprises a duration of the RAW.

8. The apparatus according to claim 5, wherein one type of station is configured as a sensor or meter and another type of station is embodied as a mobile terminal and configured to offload traffic from another network.

9. The apparatus according to claim 5, wherein the apparatus is embodied as an access point configure to operate in accordance with the Institute of Electrical and Electronics Engineers (IEEE) 802.11ah standard.

10. An apparatus for use in a station, comprising:
circuitry configured to
receive a broadcast message from an access point, the broadcast message including an indication of a type of stations to access a restricted access window (RAW), an indication of a number of slots in the RAW assigned to each type of station when more than one type of station access the RAW, and one or more of:
a duration of one or more slots in the RAW allocated to a first type of station, and
a duration of the RAW allocated to the first type of station, a duration of one or more slots in the RAW allocated to a second type of station or a duration of the RAW allocated to the second type of station; and determine whether the RAW is accessible and, in an instance in which the RAW is accessible, the slot of the RAW to be utilized, wherein the station is of the first type and calculates a number of slots allocated to the first type of stations based on a total number of slots in the RAW and a number of slots in the RAW allocated to stations of a type other than the first type, and the station transmits in one of the number of slots allocated to the first type.

11. The apparatus according to claim 10, wherein, in an instance in which the indication of the type of stations indicates that different types of stations are to access the RAW, the broadcast message further comprises an indication of an order in which the slots of the RAW are allocated to the different types of stations, and wherein the circuitry is further configured to cause the apparatus to determine the slot by determining the slot of the RAW to be utilized based upon the order in which the slots of the RAW are allocated.

12. The apparatus according to claim 10, wherein the broadcast message comprises a duration of the RAW.

13. The apparatus according to claim 10, wherein the broadcast message comprises a beacon from the access point.

14. The apparatus according to claim 13, wherein the beacon includes a RAW parameter set, and wherein the indication of the type of stations to access the RAW and one or more of the duration of one or more slots in the RAW allocated to the first type of station, the duration of the RAW allocated to the first type of station, the duration of one or more slots in the RAW allocated to the second type of station or the duration of the RAW allocated to the second type of station are included within the RAW parameter set.

15. The apparatus according to claim 10, wherein one type of station is configured as a sensor or meter and another type of station is embodied as a mobile terminal and configured to offload traffic from another network.

16. The apparatus according to claim 10, wherein the circuitry is further configured to cause the apparatus, in an instance in which the indication of the type of stations indicates that first and second different types of stations are to access the RAW, to sleep during the duration of the RAW allocated to another type of station.

17. The apparatus according to claim 10, wherein the circuitry is further configured to cause the apparatus to determine whether the RAW is accessible by determining whether the RAW includes slots allocated to the type of station in which the apparatus is comprised.

18. The apparatus according to claim 10, wherein the apparatus is embodied as a station.

19. The apparatus according to claim 18, wherein the station is configured to operate in accordance with the Institute of Electrical and Electronics Engineers (IEEE) 802.11ah standard.

* * * * *